United States Patent

[11] 3,584,438

[72] Inventors Sigmund P. Skoli
 Elmwood Park;
 Chester J. Witt, Deerfield; Harry G.
 Mojonnier, River Forest, all of, Ill.
[21] Appl. No. 738,705
[22] Filed June 20, 1968
[45] Patented June 15, 1971
[73] Assignee Mojonnier Bros. Co.
 Chicago, Ill.

[54] DEAERATOR APPARATUS
 4 Claims, 3 Drawing Figs.
[52] U.S. Cl. .................................................. 55/193,
 55/42
[51] Int. Cl. .................................................. B01d 19/00
[50] Field of Search ......................................... 55/38, 42,
 52, 55, 159, 165, 189, 190, 193, 195, 201; 99/78,
 79, 275; 165/115; 261/112, 148

[56] References Cited
UNITED STATES PATENTS
| | | | |
|---|---|---|---|
| 656,550 | 8/1900 | Kleucker..................... | 55/193 |
| 2,040,947 | 5/1936 | Mojonnier et al. ........... | 165/115 X |
| 2,169,054 | 8/1939 | Mojonnier.................... | 165/115 X |
| 2,317,951 | 4/1943 | Burk............................ | 261/112 |

Primary Examiner—Samih N. Zaharna
Assistant Examiner—R. W. Burks
Attorney—Olson, Trexler, Wolters and Bushnell ABSTRACT: A vacuum deaerator including an evacuated tank having an inlet valve at the top thereof, and outlet at the bottom thereof, and a cooling plate assembly mounted within the tank. Liquid received in the tank is deaerated by exposure to the vacuum in the latter and is cooled by the plate assembly prior to exiting through the outlet of the tank.

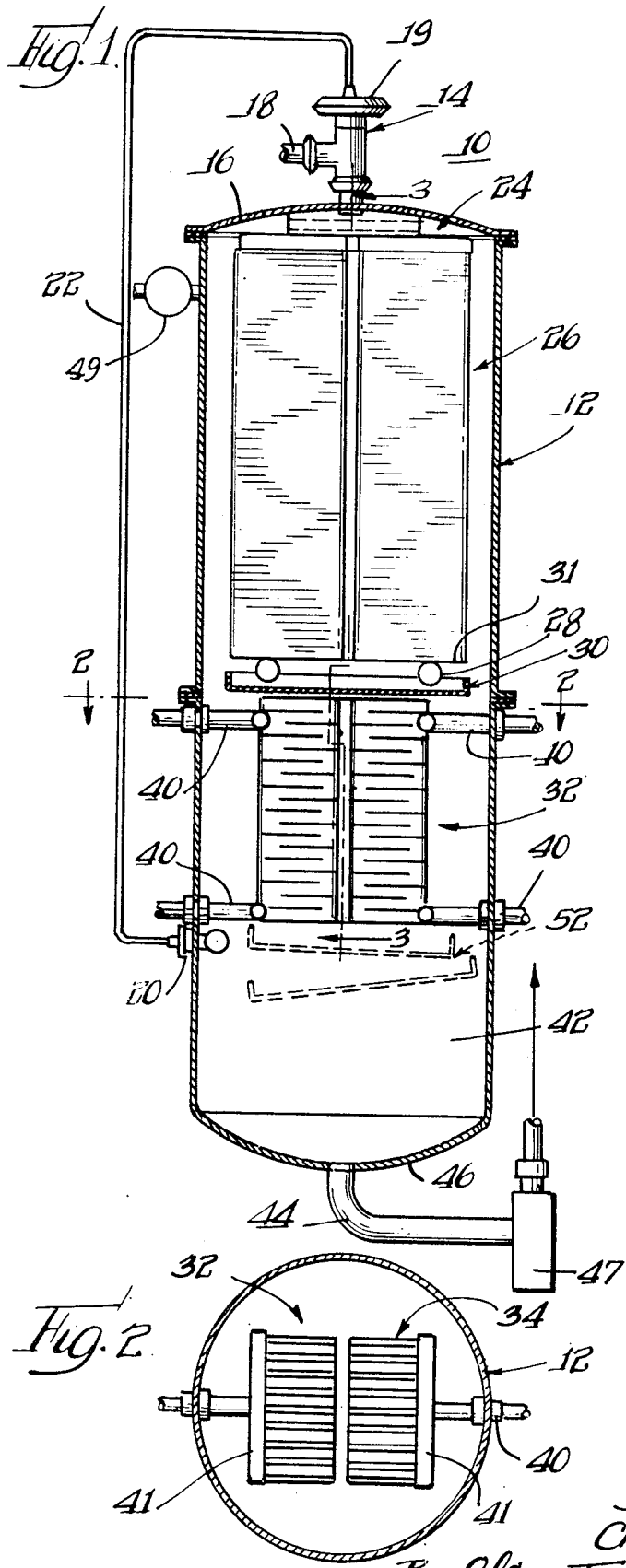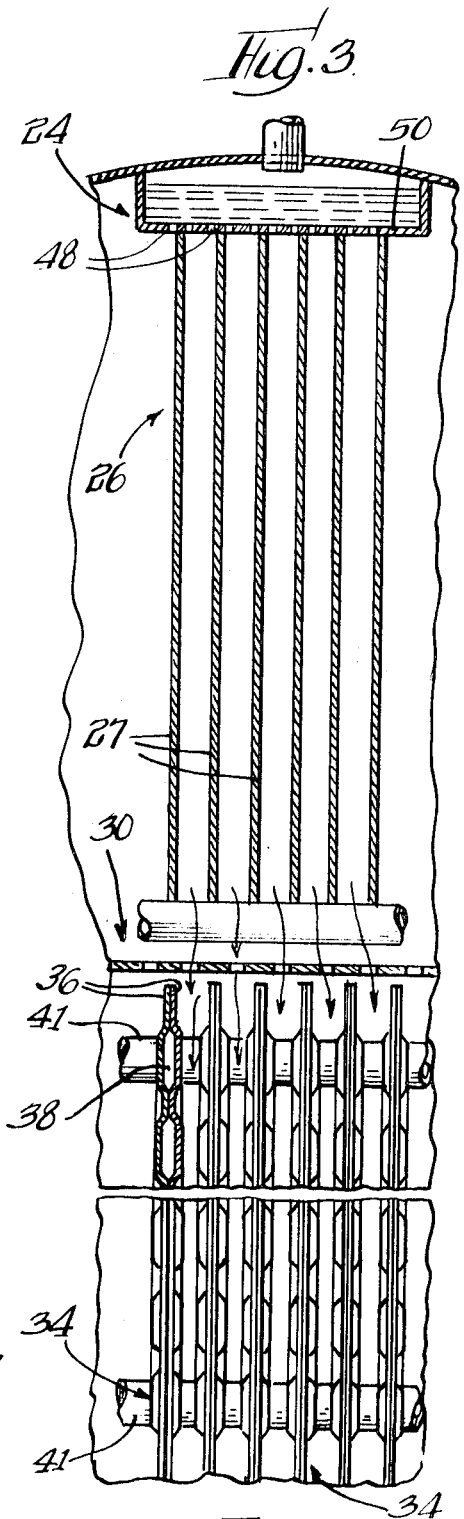
Fig. 1.
Fig. 3.
Fig. 2.
Inventors
Harry G. Mojonnier
Sigmund P. Skoli
Chester J. Witt
By: Olson, Trexler, Wolters & Bushnell attys

DEAERATOR APPARATUS

BACKGROUND OF THE INVENTION

This invention relates generally to the deaeration of liquids and more particularly to vacuum deaerator apparatus.

Vacuum deaerators are used for the removal of air and other gases from liquids for many purposes, such as, for example, the production of carbonated beverages. The removal of air from water used in the beverages prepares the latter for carbonation in that carbon dioxide may be combined easily with the water after the deaeration thereof.

A greater amount of carbon dioxide may be combined with deaerated water which is of a relatively cool temperature. In most bottling plants, however, the water used in the preparation of beverages flows from an outside tap or source and the temperature thereof fluctuates according to the season and surrounding temperatures.

Consequently, the deaerated water which reaches the location where it is to be carbonated varies in temperature. If the temperature is too high, less carbon dioxide will be combined with the water, and vice versa. This in turn causes a variation in the carbonation of the end product. In some bottling plants, a cooling chamber is provided prior to the carbonation of the deaerated water. This chamber receives deaerated water from the deaerator device and cools the water before it is passed to the carbonator station in an attempt to provide a uniform carbonation thereof. However, the separate cooling chamber unit is expensive, and because the deaerated water does not enter directly into the carbonator from the deaerator, but must first pass through the nonevacuated cooling chamber, air often recombines with the water. This in turn prevents a uniform carbonation of the water and thus again causes a nonuniformly carbonated product or beverage.

In addition to the above, liquids, such as, for example, milk, syrup for use in beverages, and the like, often are required to be deaerated and cooled for the preservation of the quality thereof. The prior art separate cooling chamber and deaeration device described heretofore, likewise suffers the same drawbacks and disadvantages for this purpose.

SUMMARY OF THE INVENTION

Accordingly, it is a general object of this invention to provide a new and improved deaerating apparatus which produces uniformly deaerated liquids having a predetermined cooled temperature.

It is a more specific object of this invention to provide a new and improved vacuum deaerator, which serves to maintain water deaerated therein at a predetermined temperature which is especially well suited for subsequent carbonation of the water.

It is another object of this invention to provide a new and improved vacuum deaerator which includes a first section for deaerating a quantity of liquid passed therethrough, and a second section for cooling the liquid as it flows therethrough while remaining in a vacuum.

DESCRIPTION OF THE DRAWINGS

A better understanding of the present invention and its organization and construction may be had by referring to the description below in conjunction with the accompanying drawings, wherein:

FIG. 1 is an axial cross-sectional view of a vacuum deaerator apparatus according to the invention;

FIG. 2 is a cross-sectional view of the vacuum deaerator apparatus of FIG. 1, taken along the line 2-2 thereof; and FIG. 3 is an axial cross-sectional view of the vacuum deaerator of FIG. 1, taken along the line 3-3 thereof.

DETAILED DESCRIPTION

Referring now to the drawings in more detail, FIG. 1 thereof illustrates a vacuum deaerator 10 according to the invention. The deaerator comprises an enclosed, elongated, cylindrically shaped tank or housing 12, preferably of stainless steel or the like material, which is evacuated in a well-known manner. A valve assembly 14 connected at the extreme upper wall 16 of tank 12 serves to pass water or other liquid, such as, milk, syrup, etc., into the tank through pipe 18 connected thereto, from a supply (not shown). A control mechanism or pressure diaphragm 19 connected to valve assembly 14 and float arrangement 20 mounted within tank 12 at the lower end thereof, are interconnected by means of a line 22, and according to the level of liquid in the tank indicated by the float arrangement 20, control the flow of liquid from the source through valve assembly 14 into tank 12.

Directly beneath the inlet valve assembly 14 is a distributing trough 24 and plate assembly 26 comprising a plurality of vertically extending plates 27, shown best in FIG. 3. Beneath the plate assembly 26 is a plurality of tubes 28 extending through the housing 12 for removal of foam from the liquid after it has passed over plate assembly 26. A second pan or trough 30 is mounted within the housing 12, directly beneath the end 31 of the plate assembly 26, and a second plate assembly 32, comprising a plurality of vertically extending plate arrangements 34, are provided beneath the last-mentioned trough 30. Each of the plate arrangements 34 includes a pair of baffled plate members 36 which have been joined, by welding or some other suitable method, to provide a series of enclosed, interconnected openings or channels 38 running back and forth therethrough. The openings are connected at both ends by means of a tube or pipe 40 to an external supply of refrigerant (not shown) which is pumped through the interconnected channels 38 to cool the plates. Because the plates are joined together by a pipe 41, only a single pipe 40 is needed to supply refrigerant to the many aligned plate arrangements 34. This is indicated in FIG. 2 of the drawings.

The lower end of the tank 12, directly beneath plate assembly 32, serves as a storage chamber 42 to hold liquid which has flowed across the above-described plates and which has thereby been deaerated. An outlet pipe 44, connected to the extreme lower wall 46 of the tank 12, serves to channel the deaerated liquid from tank 12 to a station (not shown) as it is required. A pump 47 brings the cooled, deaerated liquid from the tank 12 through pipe 44 to the station.

For purposes of affording a more complete understanding of the invention, it is advantageous now to provide a functional description of the mode in which the component parts thus far described cooperate.

In operation, liquid from a source (not shown) enters pipe 18 at the upper end of tank 12. The temperature of the liquid varies according to the temperature at the source, which in turn may be governed by a variety of factors. To enter the tank 12, the liquid passes through valve assembly 14. The valve assembly 14, as explained heretofore, is controlled by the diaphragm mechanism 19 connected thereto, which operates in accordance with the float arrangement 20 to which it is also connected. Once the liquid passes through the valve assembly 14, it falls into a distributing trough 24 located directly beneath the valve assembly within the tank. The liquid flows through apertures 48 (FIG. 3) provided in the lower or base wall 50 of the trough. This serves to distribute the liquid over the series of plates 27 comprising the deaerating plate assembly 26. The liquid flowing over plates 27 is exposed to the vacuum produced, within the tank 12, by a vacuum source 49 (FIG. 1), thereby to deaerate the liquid in a well-known manner. The plates 27 are shown herein as being straight, however, baffled or other suitable plates, such as those comprising plate assembly 32 may be used also.

Upon flowing over the entire length of the plates 27 in a vertically downward direction, due to the force of gravity, the deaerated liquid falls into a shallow trough 30. This serves to break the speed of the falling liquid after traveling over the plates 27, and also once again to distribute the liquid evenly for passage thereof over the plate assembly 32.

The deaerated liquid leaves the shallow trough 32, in a manner similar to that in the case of trough 24, and passes over the cooling plates 36 making up the cooling plate arrangements 34. The refrigerant flowing through the interconnected channels 38 within the plates of assembly 32 serves to cool the deaerated liquid; in the case of water, to approximately 65°, a temperature well suited for the carbonation thereof in the event the water is to be used in the preparation of carbonated beverages. The temperature of the plates may, however, be regulated to cool the deaerated liquid to a lower temperature, if desired. Since the cooling assembly 32 is mounted within the evacuated tank 12, there is no chance that air will recombine with the deaerated liquid as it is cooled. Thus, the deaerated liquid remains as it was after leaving the first plate assembly 26 and is brought to a lower temperature in this condition.

After the liquid has been cooled, it falls into the lower storage chamber 42 of tank 12 where it is held until required at the station (not shown). In the case of water to be carbonated, the water normally remains only for a short period of time within the storage chamber, since the deaerator can be calibrated to provide an amount of deaerated water which will be readily used at a carbonation station. If desired, a series of inclined troughs or pans 52 (shown in dotted lines in FIG. 1) may be provided beneath assembly 32 to prevent a quick descent of the liquid into the lower end of tank 12. This prevents splashing and allows for a gradual filling of the lower chamber.

In the event the liquid is not being removed from the tank, the deaerated liquid filling the lower storage chamber 42 of the deaerating tank 12 will only be allowed to reach a predetermined depth. This is due to the float arrangement 20 in the lower end of the tank. When the liquid reaches the float arrangement 20, the float is activated and it automatically causes a pressure change in diaphragm 19 at the top of the tank. Diaphragm 19, in turn, closes valve assembly 14 and allows no more liquid to enter the tank. Because the deaerator tank 12 is well insulated, and because the liquid stored in chamber 42 in the lower end thereof is in close proximity to the cooling plate assembly 26, the latter remains cool until it is required once again.

If water for use in carbonated beverages is deaerated in the tank, it will, through the cooling plate assembly, be cooled to a temperature at which a desired amount of carbon dioxide may be combined therewith. Thus, beverages made with carbonated water prepared from the deaerated water from a vacuum deaerator according to the invention are uniformly carbonated.

In some cases where the deaeration of a liquid is less critical, yet a deaerating and cooling, or in the case of water, carbonation thereof is required, the deaerating plate assembly 26 may be eliminated from within the deaerating tank 12. Deaeration of the liquid is then obtained by flashing the liquid in the upper distributing trough of the cooler (i.e. bringing the liquid containing air from a higher to a lower surrounding pressure and exposing the liquid to the latter to eliminate the air content thereof) plus flowing the liquid over the cooling plates themselves so as to further expose the liquid to the vacuum of the tank. While flashing the liquid for deaeration is not as effective as the deaerating plate assembly, it serves the purpose in some instances and a cooling plate assembly combined therewith in the evacuated tank serves to effectively condition the liquid for whatever use required.

While a particular embodiment of the invention has been shown and described, it should be understood that the invention is not limited thereto since many modifications may be made. It is therefore contemplated to cover by the present application any and all such modifications as fall within the true spirit and scope of the appended claims.

We claim:

1. Vacuum deaerator apparatus for evacuated removal of gases from fluids, comprising: housing means including an inlet portion thereof, said inlet portion adapted to receive fluids containing gases dissolved therein; first trough means mounted within said housing means and adapted for catching said fluids therein; solid plate means mounted within said housing means, said first trough means being disposed intermediate said inlet portion and said plate means and further including means for regulated and uniform distribution of said fluids therethrough; evacuator means connected to said housing means, said first trough means and said plate means cooperating to cause said fluids to cascade in relatively thin films over said plate means for efficient exposure of said dissolved gases to said evacuator means whereby substantially uniformly to remove said gases from said fluids; second trough means mounted within said housing means and adapted for catching substantially gas-free fluids therein; and cooling means mounted within said housing means, said second trough means being disposed intermediate said plate means and said cooling means and further including means for regulated and uniform distribution of said gas-free fluids therethrough, said second trough means and said cooling means cooperating to chill said gas-free fluids to a preselected temperature.

2. Vacuum deaerator apparatus according to claim 1 wherein said plate means includes a plurality of substantially vertically extending solid plate members disposed in spaced-apart relation, said plate members cooperating to cause fluids containing gases dissolved therein to flow in a plurality of relatively thin films thereover.

3. Vacuum deaerator apparatus according to claim 1 wherein said cooling means includes a plurality of substantially vertically extending plate elements disposed in spaced-apart relation, said plate elements cooperating to cause said gas-free fluids to flow in a plurality of relatively thin films thereover for efficient and uniform cooling of said gas-free fluids, said plate elements further being cooled to a temperature sufficient to chill said gas-free fluids to said preselected temperature.

4. Vacuum deaerator apparatus according to claim 3 wherein each of said plate elements is tubular and includes a continuous channel extending therethrough, said channel being adapted for passing a refrigerant therein whereby to cool said plate element.